United States Patent [19]
Motoki et al.

[11] Patent Number: 6,006,002
[45] Date of Patent: Dec. 21, 1999

[54] RIGID SLEEVE DEVICE FITTED OVER A FLEXIBLE INSERTION SECTION OF AN ENDOSCOPE FOR INSPECTING INDUSTRIAL EQUIPMENT

[75] Inventors: Nobuyuki Motoki, Hachioji; Katsunori Sakiyama, Akiruno, both of Japan

[73] Assignee: Olympus Optical Co., Ltd., Tokyo, Japan

[21] Appl. No.: 08/548,057

[22] Filed: Oct. 25, 1995

[51] Int. Cl.$^6$ .................................................... G02B 6/06
[52] U.S. Cl. ............................................................ 385/117
[58] Field of Search ...................................... 385/117, 147

[56] References Cited

U.S. PATENT DOCUMENTS

| | | |
|---|---|---|
| 4,040,413 | 8/1977 | Ohshiro ........................................ 128/6 |
| 4,167,939 | 9/1979 | Storz . | |
| 4,449,853 | 5/1984 | Mennella et al. ........................ 405/184 |
| 4,534,339 | 8/1985 | Collins et al. ................................ 128/6 |
| 4,989,581 | 2/1991 | Tamburrino et al. ........................ 128/4 |

FOREIGN PATENT DOCUMENTS

| | | |
|---|---|---|
| 3-40241 | 8/1991 | Japan . |
| 7301751 | 5/1994 | Japan . |
| 9493472 | 5/1994 | Japan . |

*Primary Examiner*—Akm E. Ullah
*Attorney, Agent, or Firm*—Frishauf, Holtz, Goodman, Langer & Chick

[57] ABSTRACT

A rigid sleeve device for an endoscope comprises an inner pipe fitted over a flexible insertion section of the endoscope and movable back and forth and a sleeve fixing unit provided in the inner pipe and detachably fixing the inner pipe at a given axial position on the outer periphery of the insertion section. The rigid sleeve device is fixed at any given position to the flexible insertion section of the endoscope.

20 Claims, 5 Drawing Sheets

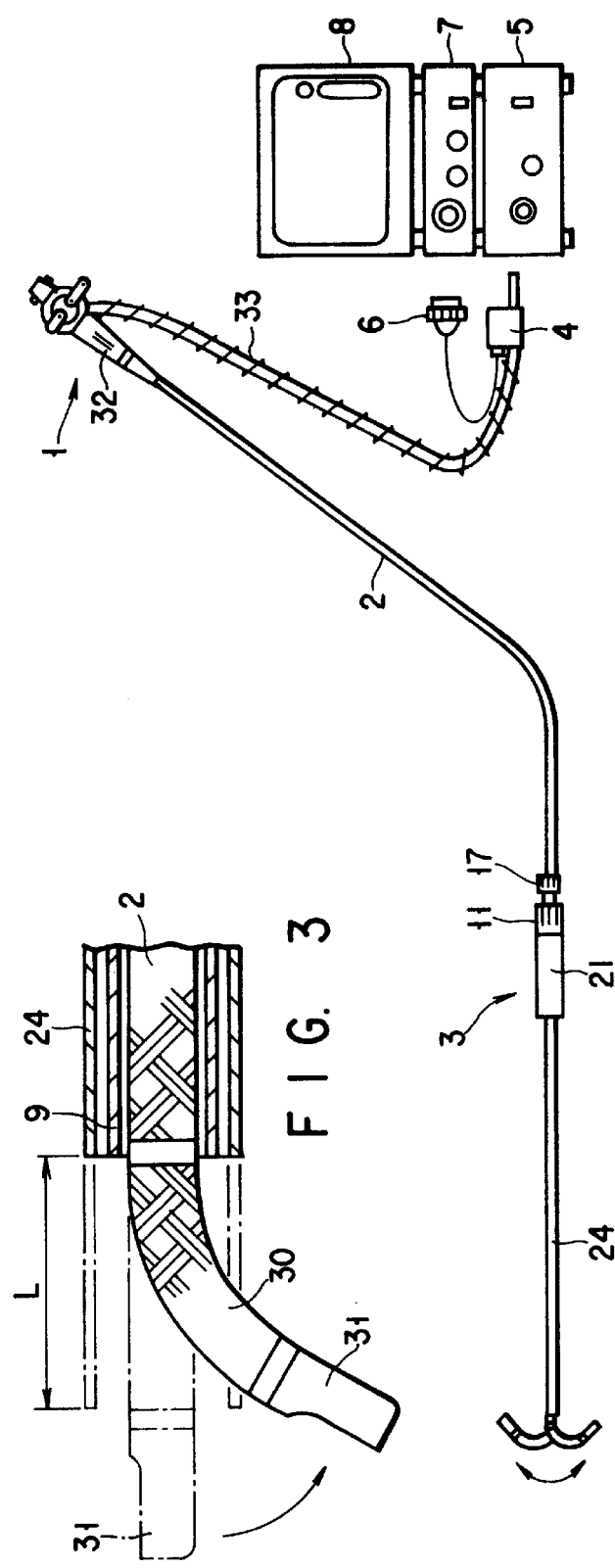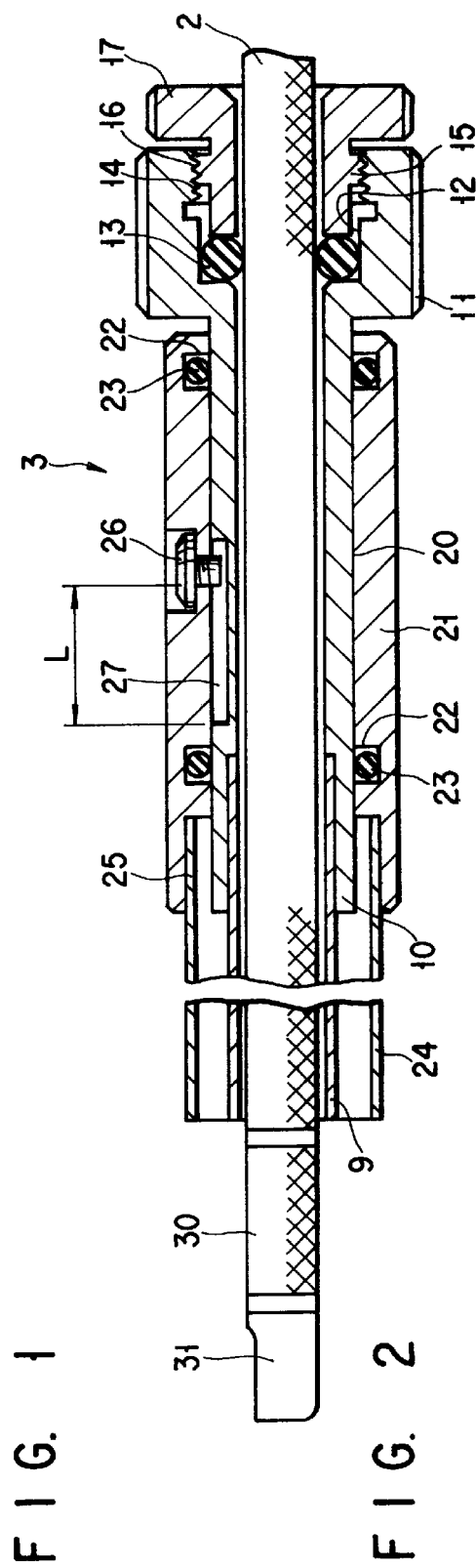

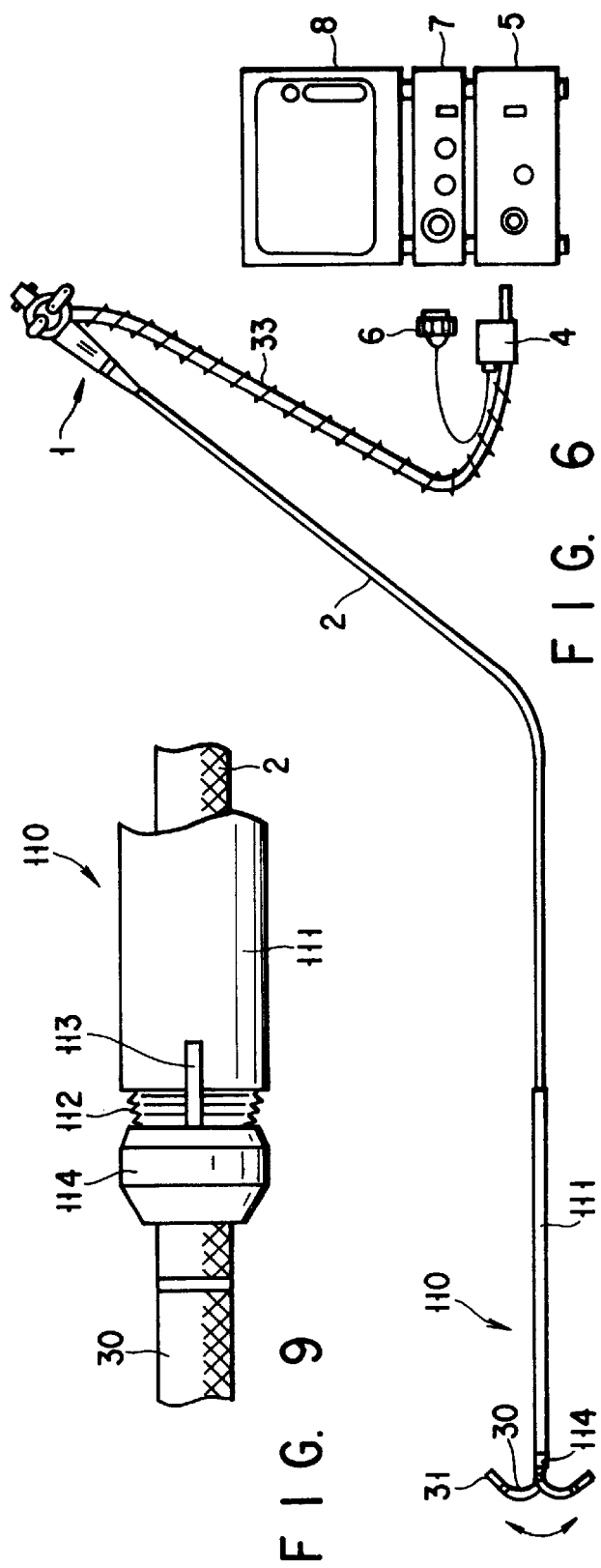
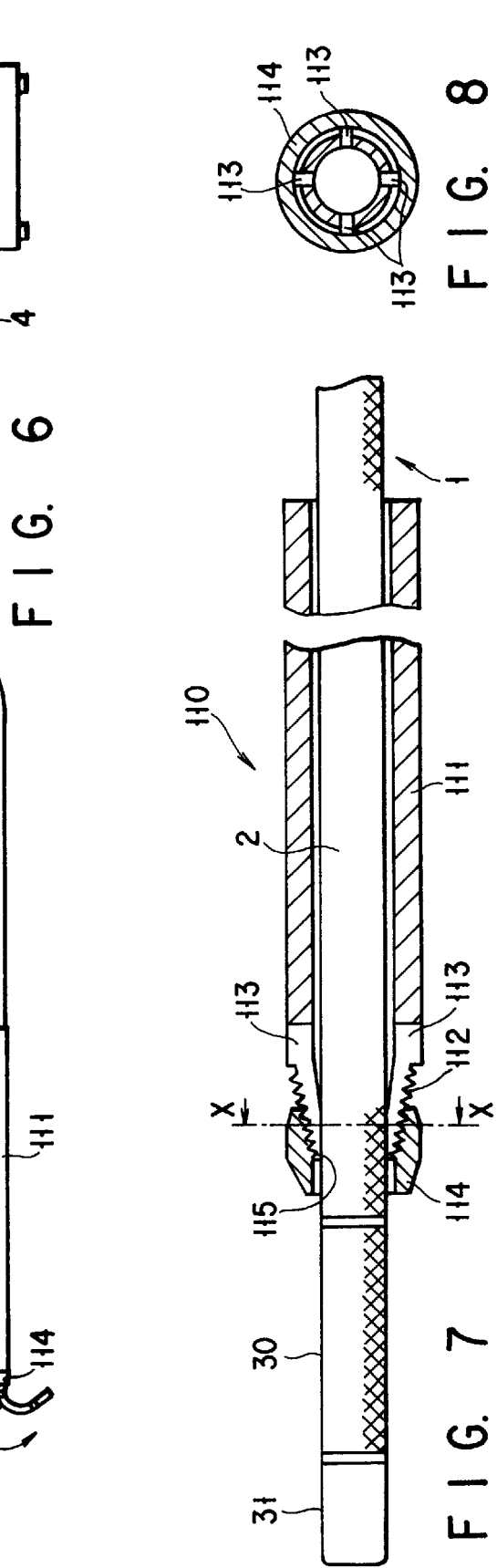
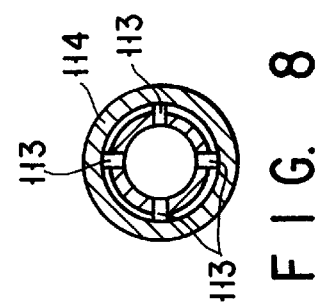
FIG. 6
FIG. 7
FIG. 8
FIG. 9

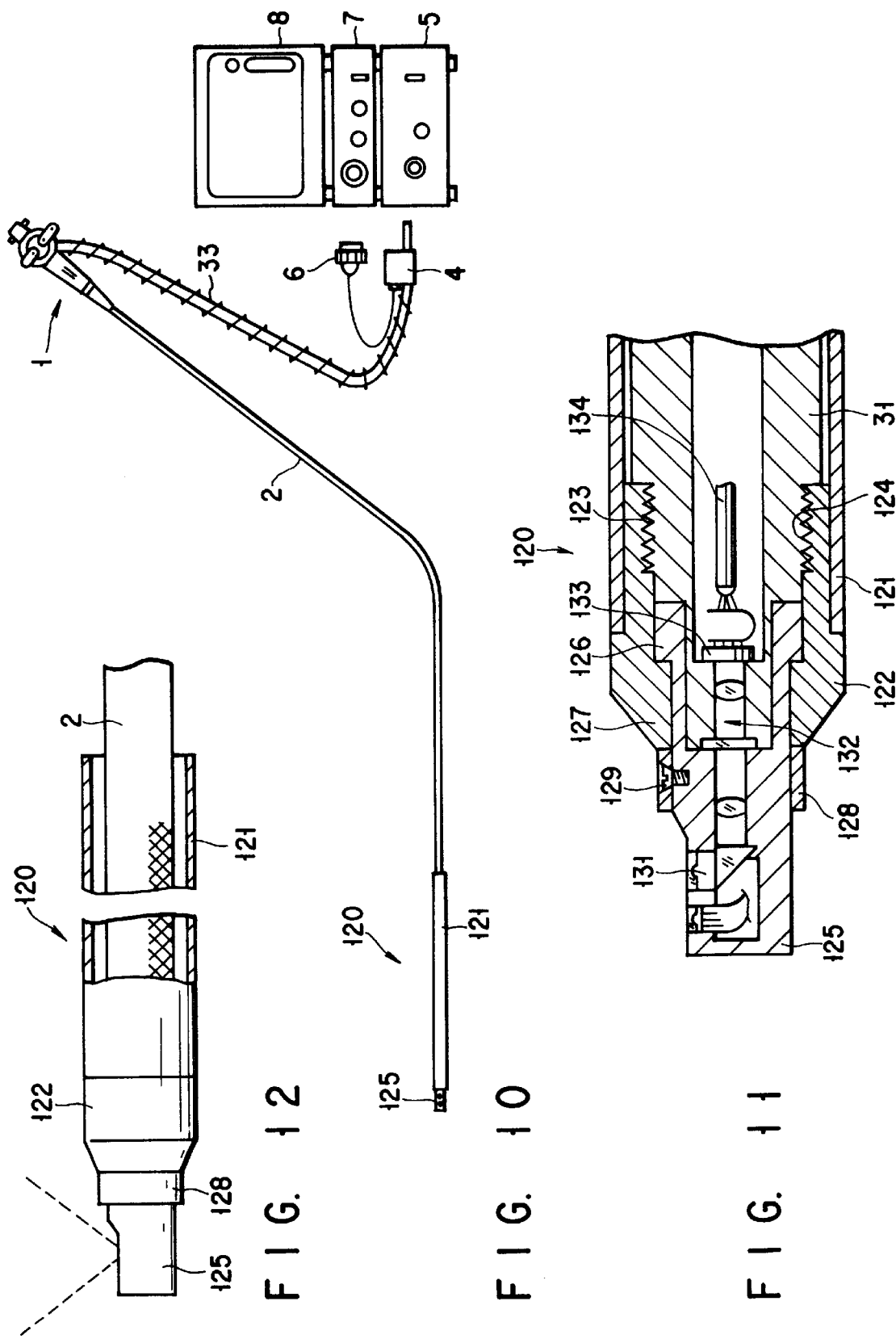

RIGID SLEEVE DEVICE FITTED OVER A FLEXIBLE INSERTION SECTION OF AN ENDOSCOPE FOR INSPECTING INDUSTRIAL EQUIPMENT

BACKGROUND OF THE INVENTION

1. Field of the Invention

The present invention relates to a rigid sleeve device for an endoscope which can be applied to a flexible endoscope for use in inspecting the interior of, for example, a jet engine and for other industrial fields of art.

2. Description of the Related Art

Generally, there are two types of endoscopes one having a rigid and the other having a flexible insertion section. In the case where an endoscope can gain access to a region of interest with its insertion section straight, a rigidoscope with a straight rigid insertion section is suitable in view of its ready accessibility to the region of interest and hence the easiness of an inspection operation. In the case where, for example, inspection is to be made on the turbine blades of the jet engine, a rigidoscope is preferably used, in place of a flexible endoscope, due to its ready handling capability in which case it is inserted through an inspection hole in the outer wall of the engine.

However, the rigidoscope is unsuitable when inspection is made on an inaccessible, not-straight inner space. In this case, the flexible endoscope is indispensable. Jpn. UM Appln. KOKOKU Publication No. 3-40241 discloses an outer sheath fitted over an insertion section of an endoscope. The outer sheath for the endoscope is fitted over a flexible insertion section and, in this case, the outer sheath is fixedly mounted on a proximal operation body of the endoscope. A means for mounting the flexible sheath relative to the proximal operation body of the endoscope provides a coupling means by which the base end of the outer sheath and the proximal operation body are combined together and fixed together. The length of the outer sheath corresponds to the insertion length of the endoscope.

Depending upon the inspecting situations, there are cases where inspection has to be made properly using both the flexible endoscope and the rigidoscope. In this case, the inspecting personnel selectively uses these two endoscopes according to the object of their uses. Therefore, it was necessary for the user to initially possess the two types of endoscopes or prepare both.

With the outer sheath in use, a corresponding detachable mount means is necessary to join the outer sheath to the endoscope and, in this case, a compatible relation is required between the outer sheath and the endoscope. This restricts the types of associated outer sheaths.

Further, outer sheaths of various lengths are required in those applications demanding varying lengths. Therefore, many endoscopes and outer sheaths have to be prepared to meet these situations, incurring added management and installment costs.

Further, although the rigidoscope is suitable for accessing, for example, the turbine blade of a jet engine, the inspection holes in the jet engine are provided at various angles around the engine and, when the rigidoscope is inserted into the inspection hole, the inspecting personnel suffers overstrain in his assumed position and hence physical pain.

SUMMARY OF THE INVENTION

It is accordingly the object of the present invention to provide a rigid sleeve device for an endoscope so as to enable a flexible endoscope to be used like a rigidoscope, but in a broader range of applications than that of an ordinary rigidoscope.

Another object of the present invention is to provide a rigid sleeve device of general-purpose type which can handle those flexible endoscopes having insertion sections of various lengths.

Another object of the present invention is to provide an endoscope which enables the user to make inspection in a relaxed position.

The object of the present invention can be achieved by the following means. That is, a rigid sleeve device for an endoscope comprises a rigid sleeve fitted over the insertion section of the endoscope and movable back and forth and a fixing means provided on the rigid sleeve and detachably fixing the rigid sleeve at any axial given position on the outer periphery of the insertion section.

The rigid sleeve device above can be fixed at any given position on the insertion section of the endoscope. The insertion section of the flexible endoscope with the rigid sleeve device mounted thereon can be handled like the rigidoscope and the device extends the application of the flexible endoscope to a broader range of observation heretofore impossible to the flexible endoscope. Any detachable mechanism of any specific relation between the endoscope and the rigidoscope is not required and, when the rigid sleeve device is used, no particular specification is required between the endoscope and the rigid sleeve device. Further, the rigid sleeve can be fixed in any given position on the insertion section of the endoscope and, even if an insertion section of different length is employed, there is no inconvenience in the handling of the endoscope and, in addition, the inspecting personnel can make inspection in a relaxed position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is an explanatory view schematically showing a whole system of a rigid sleeve device for an endoscope in accordance with a first embodiment of the present invention;

FIG. 2 is a longitudinal cross-sectional view showing a state in which the rigid sleeve device is fitted over an insertion section of the endoscope;

FIG. 3 is an explanatory view showing the operation of a distal end portion of an endoscope's insertion section over which the rigid sleeve device is fitted;

FIG. 6 is an explanatory view showing a whole system including a rigid sleeve device according to a fourth embodiment of the present invention;

FIG. 7 is a longitudinal cross-sectional view showing a rigid sleeve device according to a fourth embodiment of the present invention as fitted over an insertion section of an endoscope;

FIG. 8 is a cross-sectional view as taken along line X—X in FIG. 7;

FIG. 9 is a side view showing a rigid sleeve device according to the fourth embodiment of the present invention as fitted over an insertion section of the endoscope;

FIG. 10 is an explanatory view schematically showing a whole system including a rigid sleeve device according to a fifth embodiment of the present invention as fitted over an insertion section of an associated endoscope;

FIG. 11 is a cross-sectional view showing a state in which the rigid sleeve device according to the fifth embodiment of the present invention is fitted over the insertion section of the associated endoscope;

FIG. 12 is a side view showing a state in which the rigid sleeve device according to the fifth embodiment of the present invention is fitted over the insertion section of the associated endoscope;

DETAILED DESCRIPTION OF THE PREFERRED EMBODIMENTS

[First Embodiment]

Figure 4:
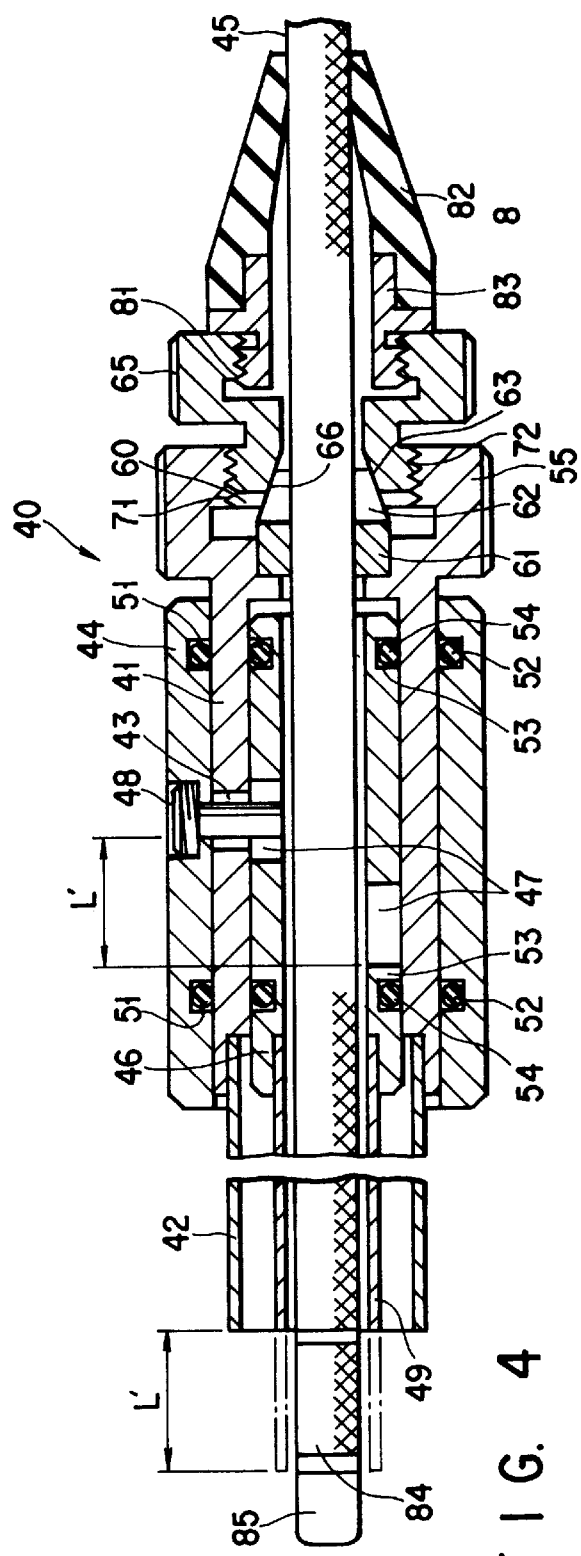
FIG. 4 is a longitudinal cross-sectional view showing a rigid sleeve device according to a second embodiment of the present invention as fitted over an insertion section of an endoscope.

A first embodiment of the present invention will be explained below with reference to FIGS. 1 to 3. As shown in FIG. 1, an endoscope system comprises a video imagescope (electronic endoscope) 1, a rigid sleeve device 3 detachably mounted at an intermediate portion of a flexible insertion section 2 of the video imagescope 1, a light source device 5 to which a light source connector 4 of the video imagescope 1 is connected, a CCU (camera control unit) device 7 to which a CCU connector 6 of the video imagescope 1 is connected, and a monitor 8 for displaying, as an image, an output signal of the CCU device 7.

In place of the scope 1 use may be made of a flexible section-equipped flexible fiberscope using an image guide fiber in combination with the light source device 5.

The rigid sleeve device 3 is so constructed as shown in FIG. 2. That is, the sleeve device 3 includes an inner pipe 9 for a rigid sleeve, namely, a pipe-like rigid member, with its base end portion mounted on a mount body (base) 10 comprised of a cylindrical member. The base end portion of the inner pipe 9 is so fixed that it is fitted in the end portion of the mount base 10. The inner pipe 9 and mount body 10 have an inner diameter of equal size and are coaxially connected to each other in a straight way. The flexible insertion section 2 of the video imagescope 1 is slidably inserted through the inner bore of the inner pipe 9 and of the mount body 10. In this embodiment, the forward end side, that is, the other end, of the inner pipe 9 provides a free end.

The base end portion of the mount body 10 provides a grasping portion thicker than the rest of the mount body 10. A mounting means is provided at the base end portion of the mount body 10 and can fix the mount body 10 in place on any position on the insertion section 2. That is, a stepped hole 12 is provided in the inner surface of the base end portion of the mount body 10 and has an inner diameter larger than a remaining portion. An O-ring 13 is fitted in the stepped hole 12 and comprised of a circular elastic member formed of, for example, fluorine or nitrile rubber. The O-ring 13 is forced into contact with the inner end face of the stepped hole 12.

An inner thread portion 14 is formed on the inner wall portion of an outer end portion of the stepped hole 12. An external thread portion 16 is formed on the outer peripheral surface of a fixed cylinder 16 and threadably inserted into the internal thread portion 14 to allow the fixed cylinder 15 to be moved back and forth. The fixed cylinder 15 serves as a ring retainer of a pressing means or as a retaining member.

The inner bore of the fixed cylinder 15 is made equal to, or greater than, the inner diameter of the inner pipe 9 and of the mount body 10. For this reason, the fixed cylinder 15, like the inner pipe 9, allows the insertion of the insertion section 2 of the video imagescope 1. The O-ring 13 in a free unstressed state in the inserted position relative to the mount body 10 has an inner diameter somewhat smaller than the outer diameter of the insertion section 2. By doing so, an interference amount between the insertion section 2 and the O-ring 13 is set to an extent to which the forward and backward movement of the insertion section 2 is prevented and to which the insertion section 2 is not readily slipped off the O-ring 13.

A large-diameter flange 17 is provided on an outer end of the fixed cylinder 15. The fixed cylinder 15 is so operated as to be turned by grasping the flange 17. The O-ring 13 is collapsed between the front end face of the fixed cylinder 15 and the inner face of the stepped hole 12 to allow its inner diameter to be decreased. By doing so, a grasping means is provided by which the insertion section 2 is tightened and grasped. The rigid sleeve device 3 is secured in place in a grasped position. The fixed cylinder 15 with the flange 17 provides an operation means for operating the grasping means.

An outer cylinder 21 for a grip area is slidably fitted over a smallest-diameter outer peripheral section 20 of the mount body 10 and serves as a cover member. O-ring grooves 22 are provided one at an area close to one end and one at an area close to the other end of the outer cylinder 21 at and along the inner wall portion. An O-ring 23 comprised of an elastic body of such a property as set out above is fitted in the respective O-ring groove 22. The O-ring 23 has an inner diameter made somewhat smaller than the inner diameter of the outer cylinder 21 and, due to an elastic interference contact with the outer peripheral section of the mount body 10, imparts a somewhat slight weight to a sliding operation of the outer cylinder 21 relative to the mount body 10.

An outer pipe 24 comprising a rigid pipe-like member has its base end portion fixedly connected to the forward end portion of the outer cylinder 21 and covers the inner pipe 9 in a way to allow a slidable movement relative to the inner pipe 9. The outer pipe 24 is so formed as to have an inner diameter greater than the outer peripheral section 20 of the mount body 10. A recessed hole 25 is provided in the inner wall portion of the forward end portion of the outer cylinder 21. The base end portion of the outer pipe 24 is abutted against a stepped end face formed deep in the recessed hole 25 and joined there in a positioned state by means such as bonding.

A pin 26 is provided at an intermediate portion in the longitudinal direction of the outer cylinder 21 for the grip area and has its forward end projected toward the mount body 10 side.

A projecting forward end of the pin 26 is fitted in an elongated groove 27 provided in the outer peripheral section of the mount body 10 along an axial direction and restricts a relative positional relation between the mount body 10 and the outer cylinder 21, thereby constituting a means for restricting an amount by which the outer pipe 24 is moved back and forth in the axial direction.

In this embodiment, the width of the elongated groove 27 is made somewhat greater than the outer diameter of the forward end of the pin 26, but the outer cylinder 21 is hardly rotated circumferentially relative to the mount body 10. Since the elongated groove 27 is provided in a parallel relation along the axial direction of the outer cylinder 21, the outer cylinder 21 can be axially slidably moved relative to the mount body 10 to an extent to which the elongated groove 27 extends.

Here, an amount of sliding movement, L, of the outer cylinder 21 relative to the mount body 10 as shown in FIG. 2 corresponds to an amount of sliding movement, L, of the outer pipe 24 relative to the inner pipe 9 as shown in FIG. 3. That is, the sliding amount L is so set as to cover, with the outer pipe 24, a length of a bending section 30 provided at the distal end of the insertion section 2. Further, the axial length of the inner and outer pipes 9 and 24 has such a relation as to have their distal ends coincide with each other in a state in which the forward end of the pin 26 abuts against the base end side (the fixed cylinder 15 side).

The inner pipe 9 and outer pipe 24 provides a rigid sleeve unit detachably fitted over a flexible insertion section of the endoscope. The inner pipe 9 and outer pipe 24 may be made of a metal, such as stainless steel, or they may be made of a resin or plastic. For the inner pipe 9 and outer pipe 24, use may be made of a snake tube, etc., with a mesh wire externally braided on the outer periphery of a spiral tube and integrally formed at its outer periphery with an elastomer as used according to the insertion section of a conventional endoscope. These may be used in a proper combination as the necessity arises. When use is made of a metal as such, the wear-resistance is improved in use. When a plastic is used, then the resultant sleeve device 3 can be made light in weight. In the case of the snake tube a bending resistance is obtained due to its flexibility.

A practical form of the rigid sleeve device 3 will be explained below. The rigid sleeve device 3 is mounted on the flexible insertion section 2 of the video imagescope in the following way. From the fixed cylinder 15 side the flexible insertion section 2 of the video imagescope 1 is inserted with its distal end ahead. Here, as shown in FIG. 2, the distal end of the inner pipe 9 is made to coincide with the base end position of the bending section 30 of the flexible insertion section 2 of the video imagescope 1. That is, the outer cylinder 21 is withdrawn relative to the mount body 10 toward the fixed cylinder 15 to abut the pin 26 against the end face of the elongated groove 27 so that the distal end of the inner pipe 9 is made to coincide with the distal end of the outer pipe 24. By doing so, the distal end of the inner pipe 9 can be seen.

With the distal end of the inner pipe 9 set at or near the base end of the bending section 30 of the insertion section 2, the fixed cylinder 17 serving as a pressing member is threadably inserted into the stepped hole 12 so that the O-ring 13 is collapsed. By properly setting an amount by which the fixed cylinder 17 is threadably inserted, the insertion section 2 and O-ring 13 are set in a mutual interfering state in which they cannot be moved. By doing so, the rigid sleeve device 3 is fixed in a given position at the insertion section 2 of the video imagescope 1.

Upon inspection of the turbine blade on the jet engine, for example, if the rigid sleeve device 3 is to be used, the outer cylinder 21 is gripped by one hand and, with the grasping portion 11 grasped by the other hand, the mount body 10 is pushed forward so that the pin 26 is abutted against the inner pipe 9-side end edge of the elongated groove 27. By doing so, as shown in FIG. 3, the distal end of the outer pipe 24 is more projected from the distal end of the inner pipe 9. As a result, the portion of the bending section 30 is extended so that it is covered with the outer pipe 24. It is to be noted, however, that the portion of the distal end section 31 with an observation window, etc., is positioned, as an unexposed portion, ahead of the distal end of the outer pipe 24.

The flexible insertion section 2 of the video imagescope 1 provides a straight rigid insertion section in the case of the rigidoscope. In this case, if the rigid insertion section is inserted via an inspection hole in the jet engine, it can be handled, like the rigidoscope, by operating the outer cylinder 21 of the rigid sleeve device 3 and grasping portion 11 of the mount body 10 on the base end side.

Further, with the outer cylinder 21 gripped and the grasping portion 11 grasped, the mount body 10 is withdrawn toward the operator's side so that the pin 26 is abutted against the user's side end edge of the elongated groove 27. At that time, the distal end of the outer pipe 24 and distal end of the inner pipe 9 are made to coincide with each other as indicated by the solid lines in FIG. 3. As a result, the bending section 30 of the insertion section 2 emerges from the distal ends of both the pipes 9 and 24. If, in this state, the distal end section 31 is inserted into the inspection hole in the jet engine, it can be handled, like the rigidoscope, by operating, on the user's side, the mount body 10 and outer cylinder 21 of the rigid sleeve device 3. If the bending function of the bending section 30 is used, broader observation can be made than in a state in which the bending section 30 is covered with the rigid sleeve device 3.

If, on the other hand, the rigid sleeve device 3 is withdrawn from the insertion section 2, the fixed cylinder 17 is turned back in a direction reverse to that in which the fixed cylinder 17 is fixedly mounted. By doing so, the collapsed state of the O-ring 23 is released back into an initial interfering state, so that the rigid sleeve device 3 can be withdrawn.

According to the first embodiment, it is possible:

(1) to broaden the application of the flexible endoscope to that of the rigidoscope and hence to observe a broader area with one flexible endoscope;

(2) to readily mount any types of endoscopes because it is only necessary to attach and detach them on the rigid sleeve device side, not on the endoscope side and because, by doing so, it is possible to mount the rigid sleeve device on any proper place at the insertion section; and (3) to provide a broader range of observation than an ordinary rigidoscope by using the bending function of the flexible endoscope and to achieve the degree of freedom with which it gains ready access to a given area. In this case it is also possible to perform a double function of making the bending section fully rigid with the bending section covered with the pipe and utilizing the bending function of the flexible insertion section, that is, to utilize a double inner/outer pipe structure and a slide structure, so that the bending section can be covered with pipe in a selective way if necessary upon inspection;

(4) to, since only the bending section, not the distal end portion of the insertion section, is covered with the corresponding pipe, apply the rigid sleeve device to a side-view or an oblique-view type endoscope without blocking its field of view; and (5) to, since the user need not look into the eyepiece as in the case of the conventional rigidoscope, readily examine or inspect a region of interest for a longer period of time in a relaxed position without causing pain in him or her.

[Second Embodiment]

A rigid sleeve device 40 according to a second embodiment of the present invention will be explained below with reference to FIG. 4. The rigid sleeve device has a mount body 41 made of a cylindrical member. An outer pipe (tube) 42 is fixedly mounted on the forward end of the mount body 41 as in the case of the first embodiment.

In the outer periphery of the mount body, an elongated hole 43 is provided along the circumferential direction to an extent corresponding to about one full circumference of the mount body. The elongated hole extends through the inner and outer circumferential walls of the mount body 41. An outer cylinder 44 for a grip area is slidably inserted over the outer periphery of the mount body 41. An inner cylinder 46 is slidably fitted in the inner wall of the mount body 41 and has an inner bore through which an insertion section 45 of an flexible endoscope is movable.

One cam groove 47 is provided in the outer periphery of the inner cylinder 46 as a spirally continuous one to an extent corresponding to about one full circumference of the inner cylinder. In this embodiment, the cam groove 47 is so formed as to pierce the inner wall side, that is, formed as a through hole.

Further, a pin 48 is fixedly mounted from the outer periphery side toward the inner wall side of the outer cylinder 44. The inner forward end of the pin 48 extends through the elongated hole 43 into the cam groove 47 in the inner cylinder 46. The elongated hole 43 and cam groove 47 are so dimensioned as to have a width greater than the outer diameter of the forward engaging end portion of the pin 48 with some clearance provided therebetween. An amount of axially relative displacement between the pin 48 and the spiral cam groove 47 is indicated by a length L' in FIG. 47.

An inner pipe 49 is fixedly connected at its base end to one end of the inner cylinder 46, that is, on the forward end side where the outer pipe 42 is mounted on the mount body 41, and is comprised of a tubular member having an inner bore through which the insertion section 45 of the endoscope is movable. The inner pipe 49 is so coaxially arranged relative to the outer pipe 42 that they provide a double pipe array with a gap created between these pipes. The length relation of the outer pipe 42 and inner pipe 49 is so set that, when the outer cylinder 44 is located on the base side relative to the inner pipe 49, the forward end of the outer pipe 42 and that of the inner pipe 49 coincides with each other.

In the inner wall of the outer cylinder 44, first O-ring grooves 51 are provided along a circumferential direction one at a one-end side and the other at an other-end side of the outer cylinder 44. An O-ring 52 comprised of an elastic body is fitted in the each O-ring groove 51. The inner diameter of the first O-ring 52 is made somewhat smaller than the outer diameter of the mount body 41 and the O-ring is pushed into abutting interfering engagement with the outer periphery of the mount body 41. For this reason, some weight is imparted to their relative slide movement.

Further, in the outer periphery of the inner cylinder 46, O-ring grooves are provided along a circumferential direction one at a one-end side and one in an other-end side of the inner cylinder 46. An O-ring 54 is provided in each O-ring groove 53 and comprised of an elastic body. The outer diameter of the second O-ring 54 is made somewhat greater than the inner diameter of the mount body 41 and the O-ring is pushed into abutting interfering engagement with the inner wall of the mount body 41, thus imparting some weight to their relative slide movement.

A grasping portion 55 is so formed at a base end of the mount body 41 as to be made somewhat thicker than the rest of the rigid sleeve device 40. A mounting/fixing means is provided on the base end of the mount body 41 to allow it to be fixed at a given position on the insertion section 45. The mounting/fixing means is comprised of a chuck 60 for clamping the insertion section 45 and includes a cylindrical member through which the insertion section 45 is allowed to be inserted. The forward end portion of the cylindrical member 61 is fixed to the base end of the mount body 41. A free end is provided at the base end side of the cylindrical member 61 and, for example, 3 or 4 cutout slits 62 are provided at an area from the insertion side of the insertion section 45 to an axial intermediate portion and tapered at an outer peripheral end portion. The cylindrical member 61 is made of a metal resin or plastic. A tapered inner wall surface 66 of a fixed cylinder 65 as will be set out below is fitted over a tapered outer peripheral surface 63 of the cylindrical member 61. The tapered end of cylindrical member 61, being tightened, is elastically deformed and diameter-reduced and the tapered inner wall surface 66 is so formed as to be set in the same inclination as, and in clutching contact with, the tapered outer peripheral surface 63.

An internal thread section 71 is formed in the inner wall portion of the base section of the mount body 41 and an external thread section 72 is provided on the outer peripheral surface of the fixed cylinder 65 serving as a pressing ring (pushing member). The fixed cylinder 65 is displaceable back and forth through the turning of the external thread section 72 into the internal thread section 71. The fixed cylinder 65 has an inner bore so formed as to be equal to, or greater than, the inner diameter of the inner pipe 49 and inner cylinder 46. This ensures ready insertion of the insertion section 45 into the rigid sleeve device.

An internal thread section 81 is formed on the base end portion of the fixed cylinder 65, that is, on an end side opposite to that at which the tapered inner wall surface 66 is situated. A stop ring 83 is threadably mounted on the internal thread section 81 and a tubular member 82 is made of an elastic member and serves as a folding-preventing member which decreases in its outer diameter along the axial direction. The stop ring 83 retains the tube member at the outer end side. The tubular member 82 has an inner diameter for allowing the insertion of the insertion section. The tubular member 82 minimizes the folding of the insertion section 45 brought out of the rigid sleeve device 40 which would occur due to its slackening. In this connection it is to be noted that such a folding-preventing tubular member 82 is not restricted to this embodiment and can be applied equally to the first embodiment in which case an equal advantage can be obtained.

This rigid sleeve device 40 is so mounted on the flexible endoscope as to allow the insertion section 45 to be inserted as in the case of the first embodiment and is set to a predetermined position. First, the outer cylinder 44 is drawn toward the user's side to set the distal end of the inner pipe 49 and that of the outer pipe 42 in such a state to coincide with each other. Further, the distal ends of the inner and outer pipes 49 and 42 are so set as to align in position with the base end of the bending section 84 of the insertion section 45.

Then with the fixed cylinder 65 threaded and the chuck 60 diameter-reduced the insertion section 45 is fixed in such a clamped state. By doing so, the rigid sleeve device 40 is fixedly mounted at a predetermined position on the insertion section 45 of the flexible endoscope. In this connection it is to be noted that, at that time, the extent of tightening is adjusted by an amount by which the fixing cylinder 65 is threadably inserted.

The mount body 41 is manually gripped and the outer cylinder 44 is turned on the mount body 41. Through the turning of the outer cylinder 44 the pin 48 is moved in the circumferential direction along an elongated hole 43 of the mount body 41. By the spiral cam groove 47 in the inner cylinder 46, the circumferential movement of the pin's top end is converted to the circumferential movement and backward/forward axial movement of the inner cylinder 46. By doing so, the inner cylinder 46 and inner pipe 49 fixed to the inner cylinder 46 are axially moved backward and forward in accordance with the rotation of the outer cylinder 44. Since the outer pipe 42 fixed to the mount body 41 is not varied in its position, the inner pipe 49 extends out of the outer pipe 42.

The extent (amount) of extension, L', is so set that the inner pipe 49 covers the bending section 84. The amount of extension, L, is shown in FIG. 4.

Upon observation, the outer cylinder 44 is turned on the mount body 41 and the inner cylinder 46 is projected toward the distal end side with the pin guided along the cam groove 47 and the bending section 84 is covered by the inner pipe 49 extending out of the outer pipe 42, but a distal end portion 85 is not covered.

Further, with the outer cylinder 44 reverse-turned the inner pipe 49 extending out of the outer pipe 42 is axially moved along the cam groove 47 and held within the outer pipe 42 so that the same bending function as in the first embodiment can be utilized.

In the case where the rigid sleeve device 40 is to be detached, the fixed sleeve device 65 is turned backward on the internal thread 71 and slackened so that a force of the chuck 60 clamping the insertion section 45 is released. By doing so, the insertion section 45 can be withdrawn out of the rigid sleeve device 40.

According to the second embodiment of the present invention it is thus possible to obtain the following advantages.

(1) Whereas in the first embodiment the outer pipe was not able to set the outer pipe 42 at a region of interest because the outer pipe 42 is moved backward and forward, in the second embodiment, the inner pipe 49 can be moved backward and forward and the rigid sleeve device can be set at the region of interest.

(2) By fixedly mounting the insertion section 45 of the endoscope by means of the chuck 60, the endurance of the mounting/fixing means is improved over that of the first embodiment. By doing so, it is possible to change the material of the elastic material to a metal or plastics.

(3) Since the outer cylinder 44 is not moved in the axial direction and the inner pipe 49 is moved backward and forward through the turning of the outer cylinder 44, it is only necessary to provide a small axial operation range. Further, since the outer cylinder 44 does not cover the outer pipe 42, the outer pipe 42 can be fixed over its full length of the outer periphery of the outer pipe 42.

(4) The endurance of the insertion section 45 is improved by the addition of the folding-preventing tubular member 82.

[Third Embodiment]

Figure 5:
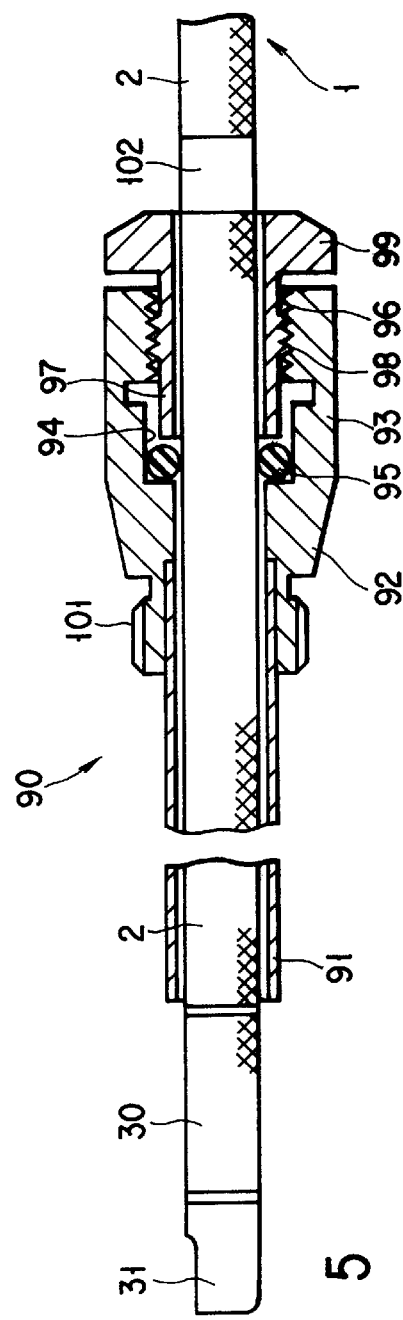
FIG. 5 is a longitudinal cross-sectional view showing a rigid sleeve device according to a third embodiment of the present invention as fitted over an insertion section of an endoscope.

FIG. 5 shows a third embodiment of the present invention. A rigid sleeve device 90 of the third embodiment includes a pipe 91 for a rigid sleeve which is formed by a rigid pipe-like member. A mount body 92 as a base body is fixed to the base end of the pipe 91 and formed of a cylindrical member. The pipe 91 and mount body 92 are coaxially connected to each other and have inner diameter equal to each other. A flexible insertion section 2 of the video image scope 1 as set out above is slidably inserted through the inner bore of the pipe 91 and mount body 92.

Further, at the outer peripheral portion of the base end portion of the mount body 92 a grip area 93 is formed which is somewhat thicker than the rest of the mount body 92. A mounting means is provided on the base portion of the mount body to enable it to be fixed at a given position on the insertion section 2. That is, a stepped hole portion 94 is provided in the inner surface portion at the base end portion of the mount body 92 and has a large inner diameter relative to the remaining portion. An O-ring 95 is fitted in the hole portion 94 and comprised of an annular elastic member formed of, for example, fluorine or nitrile rubber. The O-ring 95 is pushed into abutting engagement with the inner end of the stepped hole portion 94.

An internal thread portion 96 is formed at the outer end portion of the inner wall of the hole portion 94. A fixed cylinder 97 serving as a pressing ring of a pressing means has an external thread section 98 at its outer periphery. The external thread section 98 is set into threading engagement with the internal thread section 96. The fixing cylinder 97 serving as the pressing member can be moved backward and forward through the hole section 94 through the threaded engagement of the internal and external thread sections. The fixed cylinder 97 pushes the O-ring 95 into abutting engagement with the stepped inner end of the hole 94 so that the O-ring is sandwiched between the O-ring 95 and the inner end of the fixed cylinder 97.

The inner bore of the fixed cylinder 97 has an inner diameter equal to, or greater than, that of the pipe 91 and mount body 92. For this reason, the inner bore of the fixed cylinder 97, like the pipe 91, allows the insertion of the insertion section 2 of the video imagescope 1. The inner diameter of the O-ring 95 in a state mounted in the mount body 92 in a free untightened state is somewhat smaller than the outer diameter of the insertion section 2 inserted. The extent of interference between the insertion section 2 and the O-ring 95 is such as not to prevent the backward/forward movement relative to the O-ring 95 and not to prevent ready slippage of the insertion section 2 off the O-ring 95.

A large-diameter flange 99 is formed on the outer end of the fixed cylinder 97 so that the user can release the grasping of the insertion section 2. The fixing cylinder 97 is turned with the manual grasping of the flange 99. By doing so, the O-ring 95 is collapsed between the forward end face of the fixed cylinder 97 and the stepped inner end of the hole portion 94 and diameter-reduced. This provides a grasping means for tightening the insertion section 2 and fixes the rigid sleeve device 90 at that tightening position.

An external thread section 101 is formed on the outer periphery of the forward end portion of the mount body 92. The external thread section 101 is threaded with an internal thread, for example, on an inspection hole of a jet engine.

An index 102 for indicating a mount position of the rigid sleeve device 90 is provided on the flexible insertion section 2 of a video imagescope 1. The mark of index is provided, by a paint, tape, etc., on the insertion section 2 at a given position so that, when the index 102 is fixed, the distal end of the pipe 91 is positioned just behind a bending section 30 of the insertion section 2 of the video imagescope.

The rigid sleeve device 90 is mounted on the insertion section 2 of the video imagescope as follows. First, the flexible insertion section 2 of the video imagescope is inserted through the rigid sleeve device from the fixed cylinder 103 side. The fixed cylinder 97 is turned at the index 102 on the insertion section 2, causing the O-ring 95 to be pushed into a collapsed state and diameter-reduced so that, through the resulting tightening of the insertion section 2, the rigid sleeve device 90 is fixed in that position. The rigid sleeve device 90 can also be fixed at a position other than the aligning position of the index 102.

By doing so, the flexible insertion section 2 of the video imagescope 1 provides a straight rigid insertion section as in the case of the rigidoscope. If, in this state, the device is inserted via an inspection hole in the jet engine, the video imagescope 1 can be handled in the same way as the rigidoscope.

Although, in the present embodiment, explanation is given about using the video imagescope 1, it is of course possible to apply the device to a fiberscope. In the conventional rigidoscope, the user has to look into the eyepiece of the rigidoscope in an overstrained position, but if, according to the present invention, use is made of the fiberscope 1 and rigid sleeve device 90, the user can look into the eyepiece of the fiberscope in a relaxed position because the flexible insertion section 2 of the rear side of the rigid sleeve device 90 is freely bendable.

The external thread section 101 of the mount body 92 may be used by turning it at an associated inspection hole of the jet engine. According to the third embodiment, since the index 102 for indicating the fixing position of the rigid sleeve device 90 is provided on the insertion section 2 of the video imagescope 1, so that the mounting operation of the rigid sleeve device 90 can be improved. Further, the single pipe 91 is provided on the rigid sleeve device 90 and an inexpensive device can be provided in comparison with the first and second embodiment.

[Fourth Embodiment]

FIGS. 6 to 9 show a fourth embodiment of the present invention. The rigid sleeve device 110 of the present invention has, as shown in FIGS. 7 and 8, a pipe 111 for a rigid sleeve which is formed of a rigid pipe-like member. The pipe 111 is fitted over the flexible insertion section 2 of the video imagescope 1 as set out above, so that the insertion section 2 can be slidably inserted into the rigid sleeve device 110.

A tapered external thread section 112 can be provided on one end portion of the pipe 111. For example, four slits are provided on the end portion of the external thread section 112 and a fixing nut 114 is set in threading engagement with the tapered external thread section 112. The pipe 111 is made of a metal or resin. A taped internal thread section 115 is provided in the inner surface of the fixing nut 114 serving as an operation unit and inserted over the external thread section 112 in a threaded relation.

With the pipe 111 fitted over the insertion section 2 and the fixing nut 114 tightened, the internal diameter of the end portion of the external thread section 112 is elastically deformed and diameter-reduced, so that the insertion section 2 of the video imagescope 1 is grasped in place.

By doing so, the endoscope equipped with the flexible insertion section 2 can be handled as if it were a rigidoscope.

[Fifth Embodiment]

FIGS. 10 to 12 show a fifth embodiment of the present embodiment. A rigid sleeve device 120 of the present embodiment has a pipe 121 for a rigid sleeve which is comprised of a rigid pipe-like member. A distal end portion of the pipe 121 is coaxially fitted on the rear end portion of a cylindrical mount thread member 122 and, for example, joined there by, for example, bonding. An internal thread section 124 is provided in the inner surface of the rear end portion of the mount thread member 122 and set in threading engagement with the external thread section 123 formed on a distal end portion 31 of the insertion section 2 of the video imagescope 1 as set out above.

A side-view optical adaptor 125 is fitted over the distal end portion of the mount thread member 122. A flange 126 is formed at the rear end edge of the optical adaptor 125. A stop ring 128 is fitted over an intermediate outer periphery of the optical adaptor 125. A small-diameter projection 127 is provided on the distal end portion of the mount thread member 122 and is helded, in a front/back direction, between the flange 126 and the stop ring 128 so that the optical adaptor 125 is fixed to the mount thread member 122. The stop ring 128 is fixed by a mount screw means 129 to the outer periphery of the optical adaptor 125. The optical adaptor 125 is rotatable around the fitting axis relative to the mount thread member 122.

The optical adaptor 125 includes a built-in side-view objective optical system 131. The optical system 131 has its optical axis aligned with that of an objective optical system 132 at the distal end section 31 of the insertion section 2 of the video imagescope 1. A solid image pickup element 133 is provided in the distal end 31 of the insertion section 2 and an image picked-up signal is transmitted via a cable 134.

With the rigid sleeve device 120 mounted by the mount screw 129 on the distal end section 31 of the insertion section 2, the pipe 121 covers the flexible insertion section 2 and the resultant device can be used as if it were a rigidoscope.

Further, by applying the optical adaptor of the existing endoscope to the rigid sleeve device it is possible to use the flexible endoscope as if it were a rigidoscope.

[Sixth Embodiment]

Figure 13:
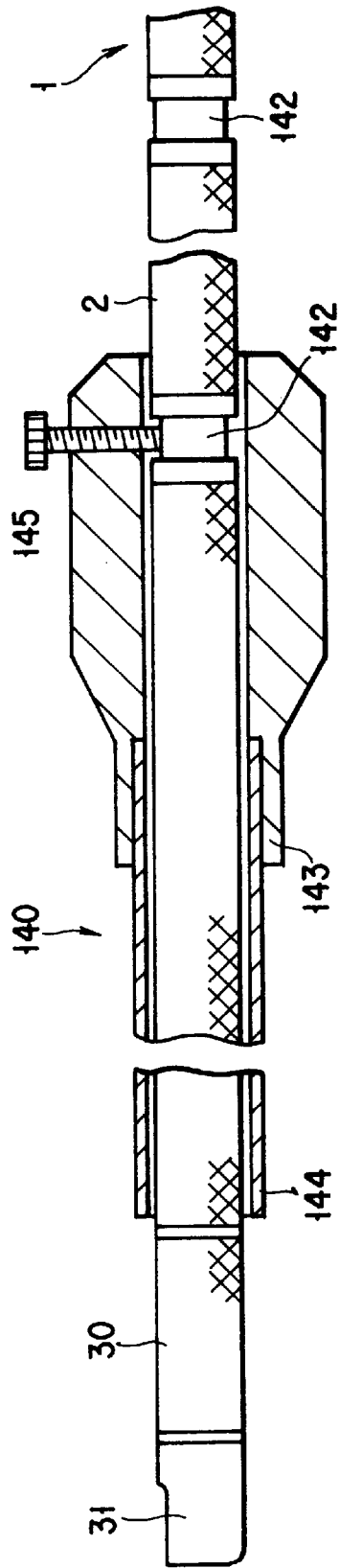
FIG. 13 is a cross-sectional view showing a state in which a rigid sleeve device according to a sixth embodiment of the present invention is fitted over an insertion section of an associated endoscope.

FIG. 13 shows a sixth embodiment of the present invention. A rigid sleeve device 140 of this embodiment is of such a type that it can be fixedly mounted at a plurality of places 142 on the flexible insertion section 2 of the video imagescope. A pipe 144 of the rigid sleeve device 140 is joined to a cylindrical body 143 by means of a bonding agent, etc. The pipe 144 and cylindrical body 143 are connected together in an coaxial array. A fixing screw means 145 is provided in the cylindrical body 143.

The rigid sleeve device 140 is fitted over an insertion section 2 and fixed by the fixing screw means 145 on the insertion section 2 at a fixing position. The fixed sleeve device 140 is positively fixed on the insertion section 2 at the fixing place 142. Further, the rigid sleeve device 140 can be selectively located at one of a plurality of fixing positions.

[Seventh Embodiment]

Figure 14:
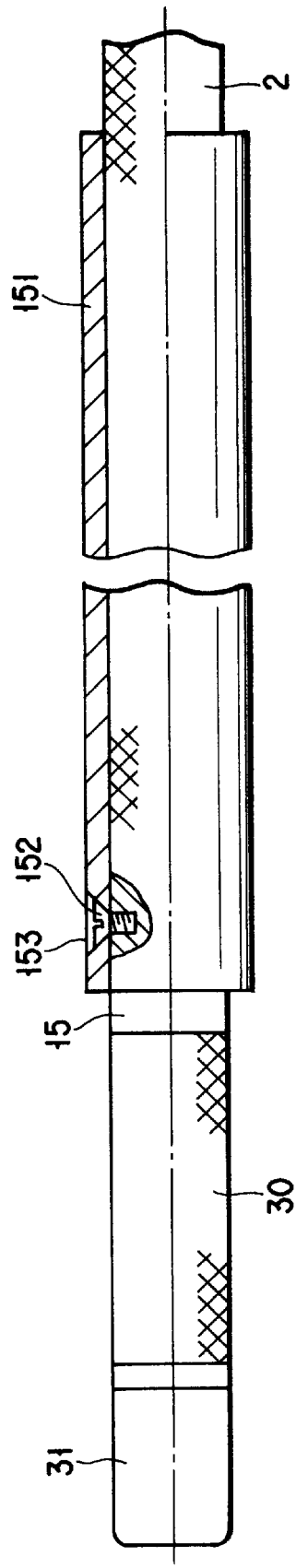
FIG. 14 is a cross-sectional view showing a state in which the rigid sleeve device according to the sixth embodiment of the present invention is fitted over the insertion section of the associated endoscope.

FIG. 14 shows a seventh embodiment of the present embodiment. A rigid sleeve device 150 of the present embodiment includes a pipe 151 slidably fitted over an insertion section of a scope 1. A hole 153 is provided in a distal end portion of the pipe 151 and a corresponding screw means 152 is mounted in the hole 153 in a fixing section 154 at the insertion section 2, so that the rigid sleeve device 150 is fixed in place. The fixing section 154 is located just behind a bending section 30.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rigid sleeve device for an endoscope, comprising:
   a rigid sleeve adapted to be detachably fitted over a flexible insertion section of the endoscope, said rigid sleeve being shorter in length than the flexible insertion section; and
   sleeve fixing means provided on one end of the rigid sleeve and capable of detachably fitting the rigid sleeve at any position over the flexible insertion section.

2. The rigid sleeve device according to claim 1, wherein:
   the rigid sleeve comprises a plurality of pipes; and
   one of the plurality of pipes is movable back and forth in a sleeve axis direction relative to another pipe.

3. The rigid sleeve device according to claim 2, further comprising a unit for restricting a moving amount of said one pipe movable back and forth in an axial direction.

4. The rigid sleeve device according to claim 1, wherein the rigid sleeve comprises a double pipe structure having an outer pipe and an inner pipe, the outer pipe being movable back and forth in an axial direction relative to the inner pipe.

5. The rigid sleeve device according to claim 1, wherein the rigid sleeve comprises double pipe structure having an outer pipe an inner pipe, the inner pipe being movable back and forth in an axial direction relative to the outer pipe.

6. The rigid sleeve device according to claim 1, wherein the sleeve fixing unit comprises a grasping unit which includes:
   an elastic member pressing the insertion section through an elastic deformation to grasp the insertion section in place; and
   an operation unit for deforming the elastic member.

7. The rigid sleeve device according to claim 6, wherein the elastic member comprises rubber.

8. The rigid sleeve device according to claim 6, wherein:
   the elastic member comprises a cylindrical member having slits and grasping the insertion section upon being diameter-reduced; and
   the operation unit has an additional member for diameter-reducing the cylindrical member.

9. The rigid sleeve device according to claim 8, wherein:
   the cylindrical member has a tapered external thread section on an outer periphery thereof; and
   said additional member has a tapered internal thread section engaged with the external thread section.

10. The rigid sleeve device according to claim 8, wherein the cylindrical member is formed of a metal.

11. The rigid sleeve device according to claim 8, wherein the cylindrical member is formed of a resin.

12. The rigid sleeve device according to claim 1, wherein the sleeve fixing unit comprises a grasping unit which includes a thread member abutting against the insertion section and set in engaged relation to the insertion section.

13. The rigid sleeve device according to claim 12, further comprising at least one fixing section provided in the insertion section to enable the thread member to be pressed against the insertion section.

14. The rigid sleeve device according to claim 1, wherein the rigid sleeve is shorter in full length than a full length of the flexible insertion section.

15. A rigid sleeve device for an endoscope, which is fitted over a flexible insertion section having a bending section, comprising:
   a rigid sleeve having a double pipe structure detachably fitted over a flexible insertion section of the endoscope, said double pipe structure including one pipe and another pipe, said one pipe being movable back and forth in an axial direction relative to said another pipe to cover the bending section; and
   a sleeve fixing unit, provided at the rigid sleeve, for (i) grasping the insertion section and to fix the rigid sleeve in place, and (ii) freely releasing the grasping of the insertion section.

16. The rigid sleeve device according to claim 15, wherein when said one pipe is moved forward, the rigid sleeve is fixed in that portion where said one pipe covers the bending section of the flexible insertion section.

17. The rigid sleeve device according to claim 15, wherein the rigid sleeve is such that the axial back/forth movement distance is substantially equal to a length of the bending section of the endoscope.

18. The rigid sleeve device according to claim 1, wherein the rigid sleeve is provided integral with an optical adaptor.

19. A rigid sleeve device for an endoscope, which is fitted over a flexible insertion section of an endoscope, comprising:
   a rigid sleeve adapted to be detachably fitted over a flexible insertion section of an endoscope; and
   a sleeve fixing means provided on the rigid sleeve, for (i) grasping the insertion section to fix the sleeve in place, and (ii) releasing the grasping of the insertion section.

20. The rigid sleeve device according to claim 19, wherein the sleeve fixing means comprises grasping means which includes:
   an elastic member pressing the insertion section through an elastic deformation to grasp the insertion section in place; and
   operation means for deforming the elastic member.

* * * * *